United States Patent
Che et al.

(10) Patent No.: US 7,916,710 B2
(45) Date of Patent: Mar. 29, 2011

(54) METHOD, DEVICE, SYSTEM AND SOFTWARE PRODUCT FOR ALTERNATIVE TIME DIVISION DUPLEX FRAME STRUCTURE OPTIMIZATION

(75) Inventors: Xiangguang Che, Beijing (CN); Zhi-Chun Honkasalo, Kaunianen (FI); Yuan Zhu, Beijing (CN); Chunye Wang, Beijing (CN)

(73) Assignee: Nokia Corporation, Espoo (FI)

( * ) Notice: Subject to any disclaimer, the term of this patent is extended or adjusted under 35 U.S.C. 154(b) by 340 days.

(21) Appl. No.: 11/982,732

(22) Filed: Nov. 2, 2007

(65) Prior Publication Data

US 2008/0144530 A1     Jun. 19, 2008

Related U.S. Application Data

(60) Provisional application No. 60/856,498, filed on Nov. 2, 2006.

(51) Int. Cl.
*H04B 7/212* (2006.01)
*H04J 3/06* (2006.01)

(52) U.S. Cl. .................. 370/345; 370/347; 370/509
(58) Field of Classification Search .................. 370/345, 370/347, 442, 509
See application file for complete search history.

(56) References Cited

U.S. PATENT DOCUMENTS

| | | | |
|---|---|---|---|
| 7,098,847 B2* | 8/2006 | Li | 342/368 |
| 7,336,599 B2* | 2/2008 | Hwang et al. | 370/208 |
| 7,542,450 B2* | 6/2009 | Li et al. | 370/335 |
| 2004/0005887 A1* | 1/2004 | Bahrenburg et al. | 455/422.1 |
| 2005/0058105 A1* | 3/2005 | Yu | 370/335 |
| 2005/0111396 A1* | 5/2005 | Kim | 370/318 |
| 2006/0087997 A1* | 4/2006 | Li | 370/320 |
| 2006/0227855 A1* | 10/2006 | Xu et al. | 375/149 |
| 2008/0045228 A1* | 2/2008 | Zhang et al. | 455/450 |
| 2008/0225802 A1* | 9/2008 | Sun et al. | 370/336 |

FOREIGN PATENT DOCUMENTS

| | | |
|---|---|---|
| EP | 1 424 790 A1 | 6/2004 |
| EP | 1 511 190 A1 | 3/2005 |

OTHER PUBLICATIONS

3GPP TR 25.814 v1.2.0 (Feb. 2006); 3rd Generation Partnership Project; Technical Specification Group Radio Access Network; Physical layer Aspects for Evolved UTRA (Release 7).
3GPP TSG RAN WG1 Meeting #46bis, Seoul, Korea, Oct. 9-13, 2006; "SCH Structure and Cell Search Method for E-UTRA TDD System"; R1-062786.
R1-062785; 3GPP TSG RAN WG1 Meeting #46bis, Seoul, Korea, Oct. 9-13, 2006; "Consideration on the non-Synchronized Random Access Procedure for EUTRA TDD".

(Continued)

*Primary Examiner* — Andrew Lee
(74) *Attorney, Agent, or Firm* — Ware, Fressola, Van Der Sluys & Adolphson LLP

(57) ABSTRACT

A method, mobile device, network device, and software product are for forming a time division duplex frame structure, including a downlink pilot timeslot within an initial data timeslot of the frame structure, and also including an uplink pilot timeslot in a further data timeslot of the frame structure. A guard period is located between the initial data timeslot and the further data timeslot.

20 Claims, 6 Drawing Sheets

OTHER PUBLICATIONS

"WCDMA for UMTS; Radio Access for Third Generation Mobile Communications", Ed. H. Holma et al, 2nd Edition, John Wiley & Sons Ltd., West Sussex, England, 2002; Chapter 13, pp. 351-371.

R1-062785 "Consideration on the non-synchronized random access procedure for EUTRA TDD", 3GPP RSG RAN WG1 Meeting #46bis, Seoul, Korea, Oct. 9-13, 2006; from the internet.

"SCH Structure and Cell Search Method for E-UTRA TDD System", 3GPP TSG RAN WG1 Meeting#46bis, Seoul, Korea, Oct. 9-13, 2006; from the internet. R1-062786.

3GPP TR 25.814 v7.0.0 (Jun. 2006); 3rd Generation Partnership Project; Technical Specification Group Radio Access Network; Physical Layer Aspects for Evolved Universal Terrestrial Radio Access (UTRA) (Release 7).

* cited by examiner

METHOD, DEVICE, SYSTEM AND SOFTWARE PRODUCT FOR ALTERNATIVE TIME DIVISION DUPLEX FRAME STRUCTURE OPTIMIZATION

CROSS REFERENCE TO RELATED APPLICATION

Priority is claimed to U.S. Provisional Application 60/856, 498 filed Nov. 2, 2006.

FIELD OF THE INVENTION

The invention relates to the field of wireless telecommunications. More particularly, the present invention pertains to time division duplex techniques.

BACKGROUND OF THE INVENTION

The telecommunications industry is in the process of developing a new generation of flexible and affordable communications that includes high-speed access while also supporting broadband services. Many features of the third generation mobile telecommunications system have already been established, but many other features have yet to be perfected.

One of the systems within the third generation of mobile communications is the Universal Mobile Telecommunications System (UMTS) delivers voice, data, multimedia, and wideband information to stationary as well as mobile customers. UMTS is designed to accommodate increased system capacity and data capability. Efficient use of the electromagnetic spectrum is vital in UMTS. It is known that spectrum efficiency can be attained using frequency division duplex (FDD) or using time division duplex (TDD) schemes. Space division duplex (SDD) is a third duplex transmission method used for wireless telecommunications.

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

The UTRAN consists of a set of Radio Network Subsystems 128 (RNS), each of which has geographic coverage of a number of cells 110 (C), as can be seen in FIG. 1. The interface between the subsystems is called Iur.

Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

The FDD method uses separate frequency bands for uplink and downlink transmissions over the Uu interface (i.e. over the air interface between UTRAN 104 and the User Equipment 102). In contrast, the TDD method allocates different time slots (compared to different frequencies) for these uplink and downlink communications. Generally, TDD is very flexible regarding the allocation of time slots, and therefore is very well-suited to applications that are asymmetric with respect to uplink and downlink data volume (e.g. web browsing entails a much higher downlink than uplink data volume).

The TDD method uses the same frequency band but alternates the transmission direction in time. Further details can be found in the book *WCDMA for UMTS; Radio Access for third Generation Mobile Communications*, Third Edition, c. 2004, Edited by Harri Holma and Antti Toskala, and Chapter 13 titled "UTRA TDD Modes" is incorporated by reference herein. The term downlink or forward link refers to transmission from the base station (fixed network side) to the mobile terminal (user equipment), and the term uplink or reverse link refers to transmission from the mobile terminal to the base station. Since TDD uses the same frequency band but alternates the transmission direction in time, the frame structure of TDD needs to be carefully and smartly designed.

LTE, or Long Term Evolution (also known as 3.9G), refers to research and development involving the Third Generation Partnership Project (3GPP) aimed at identifying technologies and capabilities that can improve systems such as the UMTS. 3GPP is working on a standardization of LTE wherein both FDD and TDD duplex mode will be considered equally important.

3*GPP TR 25.814, Physical Layer Aspects for Evolved Universal Terrestrial Access (UTRA) (Release 7)*, Version 7.0.0 (2006-6), is hereby incorporated by reference in its entirety. TR 25.814 defines two frame-structure options for LTE TDD; one of the two options is a frame structure compatible with a low chip rate (LCR) TDD, in order to accommodate coexistence with LCR-TDD. The LCR-TDD-compatible frame structure includes both data timeslots (TS) length TS0-TS6, and special timeslots position: downlink pilot timeslot (DwPTS), guard period (GP1), and uplink pilot timeslot (UpPTS).

Some characteristics specific to the TDD system are as follows. In either downlink or uplink, the transmission is discontinuous, switching between transmission directions requires time. Thus a Guard Period (GP) is needed in order to counter the propagation delay of the inter-site-distance (ISD) so as to avoid base station to base station interference. Timing advance can be used to avoid mobile terminal to mobile terminal interference. There is a wide consensus that the guard period (GP) should be variable and flexible to satisfy different inter-site distance (ISD). Another characteristic specific to the TDD system is that a downlink and uplink synchronization channel should be previously known to a mobile terminal, and provide high accuracy performance. A further characteristic specific to the TDD system is that the channel reciprocity in TDD should be utilized, with appropriate frame structure design. Design of the TDD frame structure should at least take these issues into account, in order to achieve high and robust performance.

According to TR 25.814, chapter 6.2.1.1.1, an alternative frame structure is listed for LTE TDD in order to co-exist with LCR-TDD. Unfortunately, the alternative frame structure described in chapter 6.2.1.1.1 does not adequately take into account the issues described above, and therefore does not achieve high and robust performance. There are several reasons for this. First, the maximum inter-site distance (ISD) is upper-bounded by a fixed value of GP1 (75 µs). Second, the coverage, performance and even functionality of a random access channel (RACH) could become degraded due to the short length for the RACH preamble, which is only 125 µs for TDD RACH compared with 1 ms for FDD RACH. Third, it is difficult and inefficient to utilize the non-synchronization-channel (i.e. non-SCH) and non-RACH subcarriers in DwPTS and UpPTS, respectively, or those subcarriers are in practice not even usable, so that the time domain occupancy efficiency is decreased for LTE TDD.

Thus, the alternative frame structure described in TR 25.814, chapter 6.2.1.1.1 has advantages and disadvantages. Among the disadvantages are the following four items.

First, the downlink synchronization channel (SCH) is always transmitted in the DwPTS of its central 72 subcarriers, according to R1-062786 CATT, "*SCH Structure and Cell Search Method for E-UTRA TDD system*", Seoul, Korea, Oct. 9-13, 2006 which is hereby incorporated by reference in its entirety. Also incorporated by reference herein is R1-062785 CATT, Huawei, ZTE, RITT, "*Consideration on the non-synchronized random access procedure for EUTRA TDD*", Seoul, Korea, Oct. 9-13, 2006. This means that, when operating at a higher channel bandwidth that corresponds to 72 subcarriers, the remaining subcarriers cannot be utilized for data transmission in any meaningful manner.

A second disadvantage is that the GP1 is fixed to 75 μs. Third, the uplink synchronization channel (RACH) is transmitted in UpPTS of its one or multiple 72 (or 12 depending on the final conclusion in 3 GPP) subcarriers. And, fourth, the timeslot interval (TI) at the end of TS0 is useless, because TS0 and DwPTS are always for downlink transmission.

Among the advantages of the alternative frame structure described in TR 25.814, chapter 6.2.1.1.1 are the following. First, the relative position between SCH and GP1 is fixed, and thus no extra signaling is needed to inform mobile terminals where the downlink-to-uplink switching point is. Second, the RACH is right after SCH and GP1, and the time distance between RACH and SCH is fixed and is the shortest possible, so that the channel reciprocity can be most efficiently utilized for initial non-synchronized RACH based on the latest channel information from SCH. Third, the exact timing enables co-existence with LCR-TDD.

SUMMARY OF THE INVENTION

The present invention provides a modification to the existing alternative TDD frame structure, in such a way as to correct the above-described problems in the existing frame structure, while the advantages described above may be maintained. This invention is not just limited to the context of 3GPP, but rather has potential applications in other present and future contexts and systems.

Specifically, the invention formulates a special new timeslot TS0*. This timeslot merges the existing TS0 slot with the downlink pilot timeslot (DwPTS).

In one embodiment of the present invention, there is also a new special timeslot TS1*. This timeslot merges the existing TS1 and uplink pilot timeslot (UpPTS). As shown in FIG. 1, user equipment 102 is configured to put the UpPTS in TS1.

The new special timeslot structure is characterized by the following properties. A guard period (GP) is first reserved for 50 μs (the current GP1 value). If larger inter-site distance (ISD) is required, then more symbols from the end of TS0 can be flexibly allocated to the guard period, symbol by symbol. Some principles of TDD operation are illustrated in FIG. 2, wherein the guard period separates TS0 from TS1, instead of separating pilot timeslots.

A synchronization channel (SCH), which may consist of primary and secondary SCHs, is transmitted at a fixed location inside timeslot TS0*, e.g. $2^{nd}$ and $3^{rd}$ symbol of TS0*, as opposed to the current fixed location in DwPTS. This enables the user equipment (UE) to detect the start of a TDD frame, based on the SCH decoding.

The random access channel (RACH), including both non-synchronized and synchronized, may be transmitted in TS1* (0.825 ms). This yields a similar performance as LTE FDD and LTE TDD with generic frame structure in a macro cell environment. A further property of the new special timeslot structure is that all possible resources in both time and frequency domains can be utilized.

As an alternative way of implementing this invention, the timeslot structure of LCR-TDD remains unchanged, but the mapping of physical channels onto these timeslots is modified accordingly. For example, the LTE non-synchronized RACH may be mapped to cross the original timeslot TS1 and UpPTS. Also, the shared data channel may be mapped to cross these two adjacent timeslots.

The same principle can additionally or alternatively be applied to the two downlink timeslots TS0 and DwPTS. Thus, one physical channel may be mapped to more than one timeslot, for example the more than one timeslot being the original timeslot TS0 and the DwPTS.

Advantages of this invention include the ability to support variable ISD deployment. Also, as mentioned, all possible resources in both time and frequency domain are utilized. This is accomplished while maintaining many, if not all, benefits of the existing frame structure.

DETAILED DESCRIPTION OF THE INVENTION

A preferred embodiment of the present invention will now be described. This is merely to illustrate one way of implementing the invention, without limiting the scope or coverage of what is described elsewhere in this application.

Figure 1:
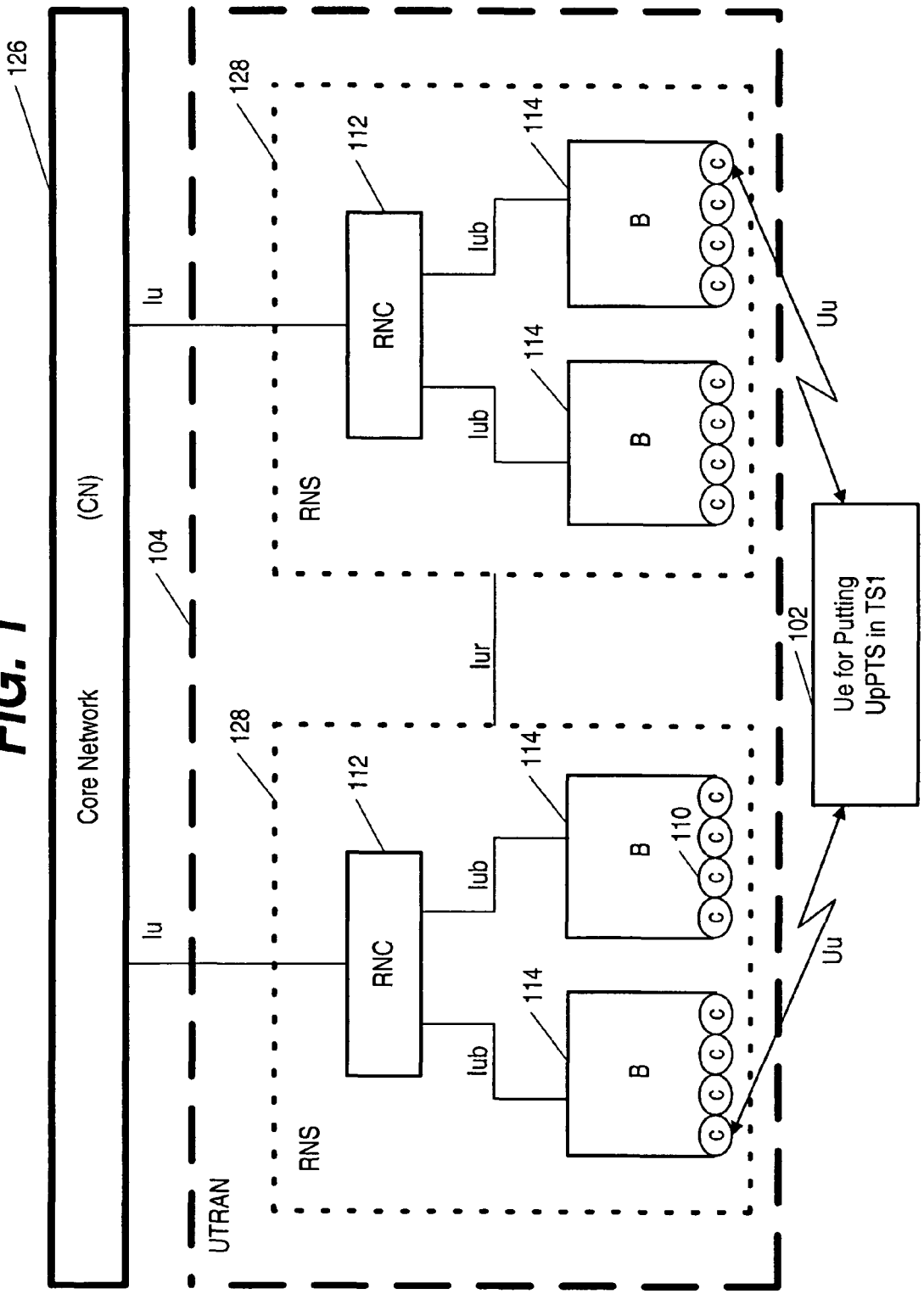
FIG. 1 shows a UTRAN system.
Figure 2:
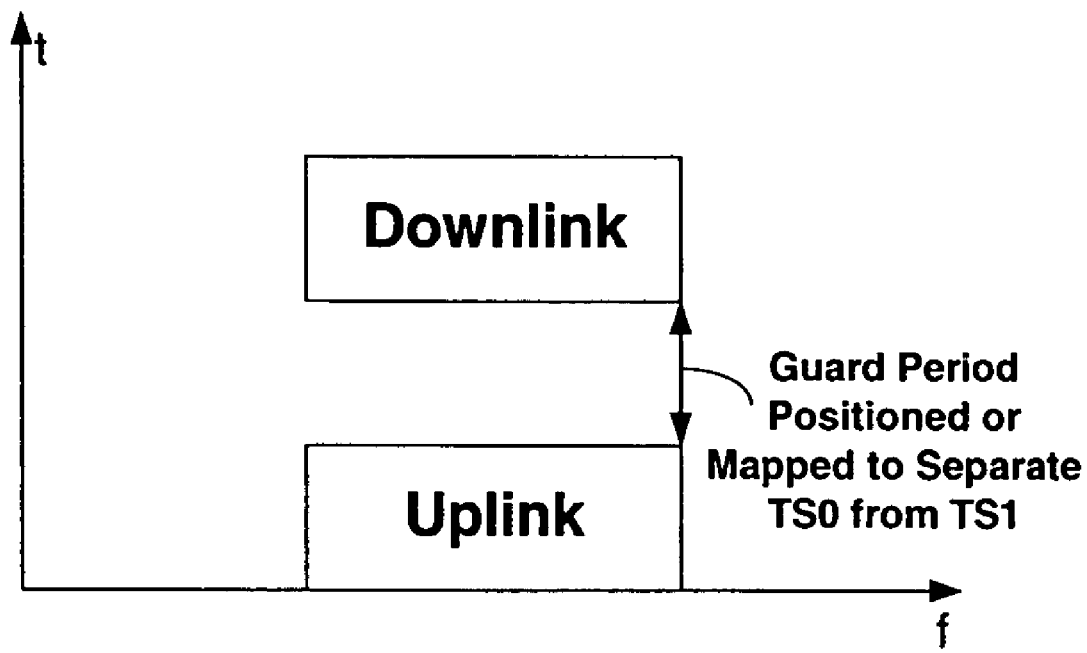
FIG. 2 shows principles of TDD operation.
Figure 3:
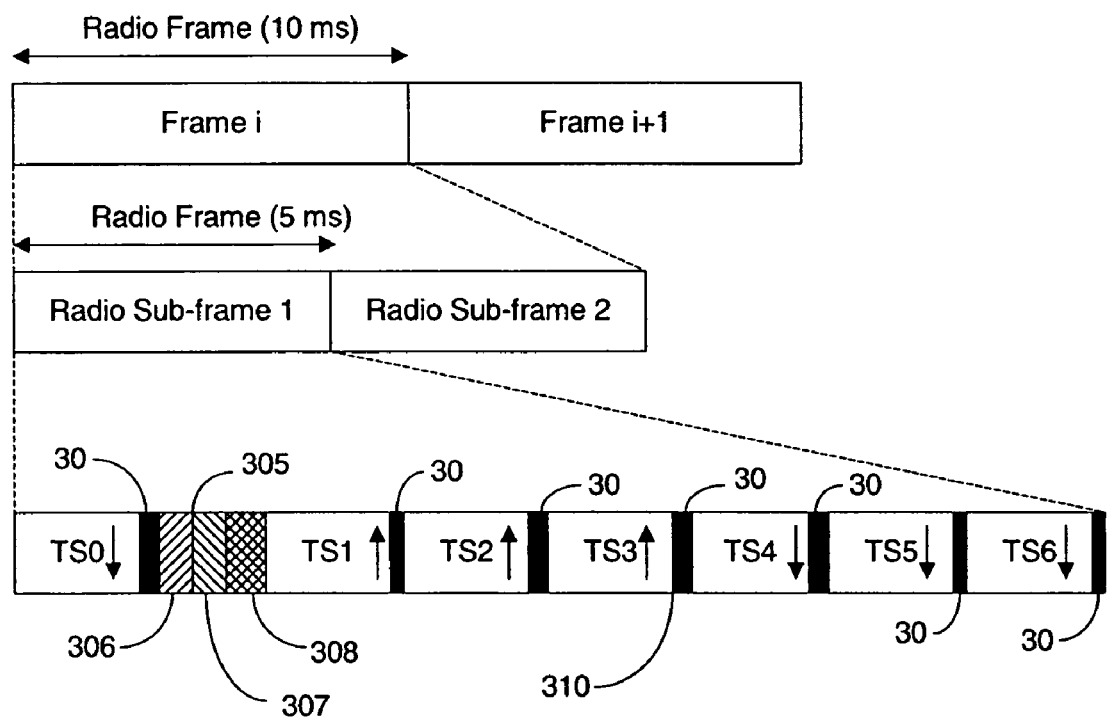
FIG. 3 shows an LTE TDD alternative frame structure

A frame structure compatible with a low chip rate (LCR) TDD, in order to accommodate coexistence with LCR-TDD, is shown in present FIG. 3. Timeslots 0-6 are separated by timeslot intervals 30. Also, downlink pilot timeslot 306, guard period 307, and uplink pilot timeslot 308 are located between timeslot 0 and timeslot 1. A switching point 305 from downlink to uplink (DUSP) occurs several timeslots before a switching point 310 from uplink to downlink. The present invention either maintains FIG. 3, while mapping physical channels onto these timeslots in a modified manner, or includes a special new timeslot TS0* which merges the existing TS0 slot with the downlink pilot timeslot (DwPTS).

Figure 4:
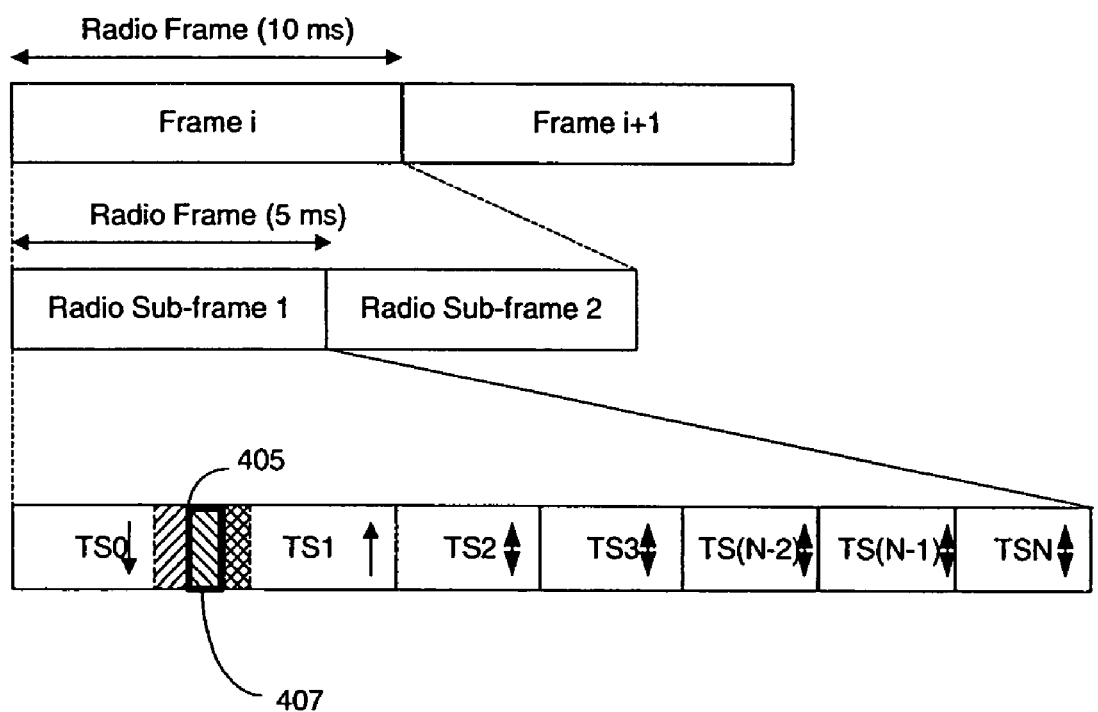
FIG. 4 shows a refined LTE TDD alternative frame structure

In one embodiment of the present invention, a new special timeslot TS1* is formulated which merges the existing TS1 and uplink pilot timeslot (UpPTS). This modified frame structure is illustrated in FIG. 4 (with the asterisks removed). Only guard period 407 is located between timeslot 0 and timeslot 1. A switching point 405 indicates a shift from downlink to uplink (DUSP).

Several concepts included in the present invention will now be briefly described, without in any way limiting what may ultimately be claimed in this application.

The invention includes a first concept which is a method comprising: forming a time division duplex frame structure; including (e.g. mapping or merging) a downlink pilot timeslot within an initial data timeslot of the frame structure; and, including an uplink pilot timeslot in a further data timeslot of the frame structure, wherein a guard period is located between the initial data timeslot and the further data timeslot.

The invention includes a second concept which is the method of the first concept, further comprising allocating symbols from the initial data timeslot to the guard period to provide a larger inter-site distance.

The invention includes a third concept which is the method of the first concept, further comprising transmitting a synchronization channel at a fixed location within the initial data timeslot.

The invention includes a fourth concept which is the method of the third concept, wherein the synchronization channel comprises a primary synchronization channel and a secondary synchronization channel.

The invention includes a fifth concept which is the method of the third concept, wherein the fixed location is at the second and third symbols of the initial data timeslot.

The invention includes a sixth concept which is the method of the first concept, further comprising transmitting a random access channel in the further data timeslot.

The invention includes a seventh concept which is the method of the sixth concept, wherein the random access channel includes both a non-synchronized and a synchronized channel.

The invention includes an eighth concept which is the method of the first concept, wherein the first data timeslot and the further data timeslot are two of only six data timeslots within the frame structure.

The invention includes a ninth concept which is a software product configured to perform the method of any of the first thru eighth concepts.

The invention includes a tenth concept which is an apparatus comprising: means for forming a time division duplex frame structure; means for including a downlink pilot timeslot within an initial data timeslot of the frame structure; and, means for including an uplink pilot timeslot in a further data timeslot of the frame structure, wherein a guard period is located between the initial data timeslot and the further data timeslot.

The invention includes an eleventh concept which is the apparatus of the tenth concept, further comprising means for allocating symbols from the initial data timeslot to the guard period to provide a larger inter-site distance.

The invention includes a twelfth concept which is the apparatus of the tenth concept, further comprising means for transmitting a synchronization channel at a fixed location within the initial data timeslot.

The invention includes a thirteenth concept which is the apparatus of the twelfth concept, wherein the synchronization channel comprises a primary synchronization channel and a secondary synchronization channel.

The invention includes a fourteenth concept which is the apparatus of the twelfth concept, wherein the fixed location comprises the second and third symbols of the initial data timeslot.

The invention includes a fifteenth concept which is the apparatus of the tenth concept, further comprising means for transmitting a random access channel in the further data timeslot.

The invention includes a sixteenth concept which is the apparatus of the fifteenth concept, wherein the random access channel comprises both a non-synchronized and a synchronized channel.

The invention includes a seventeenth concept which is the apparatus of the tenth concept, wherein the first data timeslot and the further data timeslot are two of only six data timeslots within the frame structure.

The invention includes an eighteenth concept which is any combination of the tenth thru seventeenth concepts.

The invention includes a nineteenth concept which is a software product comprising a computer readable medium having executable codes embedded therein; the codes, when executed, adapted to carry out the functions of: forming a time division duplex frame structure; including a downlink pilot timeslot within an initial data timeslot of the frame structure; and, including an uplink pilot timeslot in a further data timeslot of the frame structure, wherein a guard period is located between the initial data timeslot and the further data timeslot.

The invention includes a twentieth concept which is the software product of the nineteenth concept, wherein the functions further comprise allocating symbols from the initial data timeslot to the guard period to provide a larger inter-site distance.

The invention includes a twenty-first concept which is the software product of the nineteenth concept, wherein the functions further comprise transmitting a synchronization channel at a fixed location within the initial data timeslot.

The invention includes a twenty-second concept which the software product of the twenty-first concept, wherein the synchronization channel comprises a primary synchronization channel and a secondary synchronization channel.

The invention includes a twenty-third concept which is a network element comprising: a processor module configured to form a time division duplex frame structure having a downlink pilot timeslot within an initial data timeslot of the frame structure; and, a further processor module configured to include a guard period located between the initial data timeslot and a further data timeslot.

The invention includes a twenty-fourth concept which is the network element of the twenty-third concept, further comprising an allocation module configured to allocate symbols from the initial data timeslot to the guard period in order to provide a larger inter-site distance.

The invention includes a twenty-fifth concept which is the network element of the twenty-third concept, further comprising a memory module configured to store and supply the data for the initial data timeslot and the further data timeslot.

The invention includes a twenty-sixth concept which is a mobile device comprising: a processor module configured to form a time division duplex frame structure having an initial data timeslot, and also having an uplink pilot timeslot located within a further data timeslot of the frame structure; and, a further processor module configured to include a guard period located between the initial data timeslot and the further data timeslot.

The invention includes a twenty-seventh concept which is the mobile device of the twenty-sixth concept, further comprising an allocation module configured to allocate symbols from the initial data timeslot to the guard period in order to provide a larger inter-site distance.

The invention includes a twenty-eighth concept which is the mobile device of the twenty-sixth concept, further comprising a memory module configured to store and supply the data for the initial data timeslot and the further data timeslot.

The invention includes a twenty-ninth concept which is an apparatus comprising: means for forming a time division duplex frame structure having a downlink pilot timeslot within an initial data timeslot of the frame structure; and, means for including a guard period located between the initial data timeslot and a further data timeslot.

The invention includes a thirtieth concept which is the apparatus of the twenty-ninth concept, further comprising means for allocating symbols from the initial data timeslot to the guard period in order to provide a larger inter-site distance.

The invention includes a thirty-first concept which is an apparatus comprising: means for forming a time division duplex frame structure having an initial data timeslot, and also having an uplink pilot timeslot located within a further data timeslot of the frame structure; and, means for including a guard period located between the initial data timeslot and the further data timeslot.

The invention includes a thirty-second concept which is the apparatus of the thirty-first concept, further comprising means for allocating symbols from the initial data timeslot to the guard period in order to provide a larger inter-site distance.

The invention includes a thirty-third concept which is any of the first thru thirty-second concepts, wherein the frame structure remains unchanged, but mapping of physical channels onto timeslots is modified.

The invention includes a thirty-fourth concept which is a method comprising: forming a time division duplex frame structure; mapping a downlink pilot timeslot within an initial data timeslot of the frame structure; and, mapping an uplink pilot timeslot in a further data timeslot of the frame structure, wherein a guard period is located between the initial data timeslot and the further data timeslot.

The invention includes a thirty-fifth concept which is the method of the thirty-fourth concept, further comprising allocating symbols from the initial data timeslot to the guard period to provide a larger inter-site distance.

The invention includes a thirty-sixth concept which is the thirty-third or thirty-fourth concept, wherein a non-synchronized random access channel is mapped to cross the further data timeslot and the uplink pilot timeslot.

The invention includes a thirty-seventh concept which is the thirty-third or thirty-fourth concept, wherein a synchronization channel is mapped to cross the initial data timeslot and the downlink pilot timeslot.

For example, the LTE non-synchronized RACH may be mapped to cross the original timeslot TS1 and UpPTS. Also, the shared data channel may be mapped to cross these two adjacent timeslots. The same principle can be applied to the two downlink timeslots TS0 and DwPTS.

The embodiments described above can be implemented using a general purpose or specific-use computer system, with standard operating system software conforming to the method described herein. The software is designed to drive the operation of the particular hardware of the system, and will be compatible with other system components and I/O controllers. The computer system of this embodiment includes a CPU processor, comprising a single processing unit, multiple processing units capable of parallel operation, or the CPU can be distributed across one or more processing units in one or more locations, e.g., on a client and server. A memory may comprise any known type of data storage and/or transmission media, including magnetic media, optical media, random access memory (RAM), read-only memory (ROM), a data cache, a data object, etc. Moreover, similar to the CPU, the memory may reside at a single physical location, comprising one or more types of data storage, or be distributed across a plurality of physical systems in various forms.

A person skilled in the art will understand that it is possible to merge the two-TDD frame structure into a one-frame structure, while keeping the idea of "special timeslots" (e.g. DwPTS, GP and UpPTS) in the newly formed TDD frame structure. The idea of combining DwPTS with the preceding DL timeslot/subframe, as one longer slot for one data packet transmission or physical channel, would then remain a useful innovation. Likewise, it would also remain useful to combine the UpPTS with the following UL timeslot/subframe, as one longer slot for one data packet transmission or physical channel. A physical channel can then be mapped into more than one timeslot, e.g. DL channel is mapped to subframe #0 plus DwPTS, and UL channel is mapped to UpPTS plus subframe #2.

A person skilled in the art will also understand that the present invention can address a problem scenario that is not limited to the frame structure described in 3*GPP TR* 25.814, *Physical Layer Aspects for Evolved Universal Terrestrial Access* (*UTRA*) (*Release* 7), Version 7.0.0 (2006-6). Instead, the invention can address a more general scenario, including in the context of Time Division-Synchronous Code Division Multiple Access (TD-SCDMA). Likewise, the number of timeslots or subframes per frame need not be limited to only TS0-TS6, and instead can generally be any numbers depending on the frame length (e.g. it may be 10 ms or 20 ms frame) and timeslot/subframe length (e.g. they can be 0.5 ms or 1 ms), resulting in different numbers of timeslots or subframes per radio frame.

Figure 5:
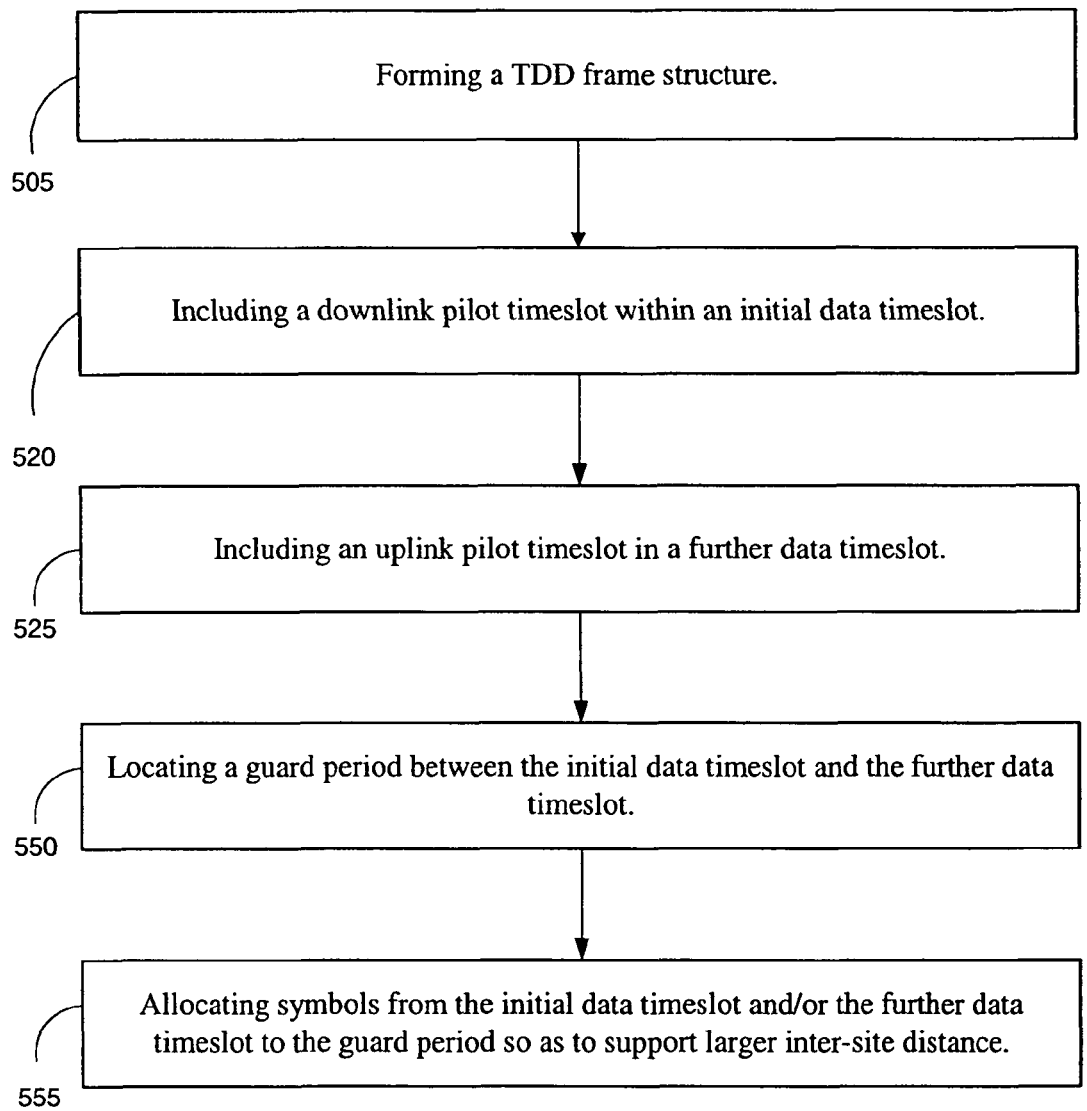
FIG. 5 is a flow chart illustrating an embodiment of the present invention.

A method 500 according to an embodiment of the present invention is shown in FIG. 5. A TDD frame structure is formed 505. A downlink pilot timeslot (DwPTS) is included 520 (e.g. via merging or mapping) within an initial data timeslot. An uplink pilot timeslot (UpPTS) is also included 525 in a further data timeslot. A guard period is located 550 between the initial data timeslot and the further data timeslot. And, symbols are allocated 555 from the initial data time slot and or from the further data timeslot to the guard period, so as to support a larger inter-site distance.

Figure 6:
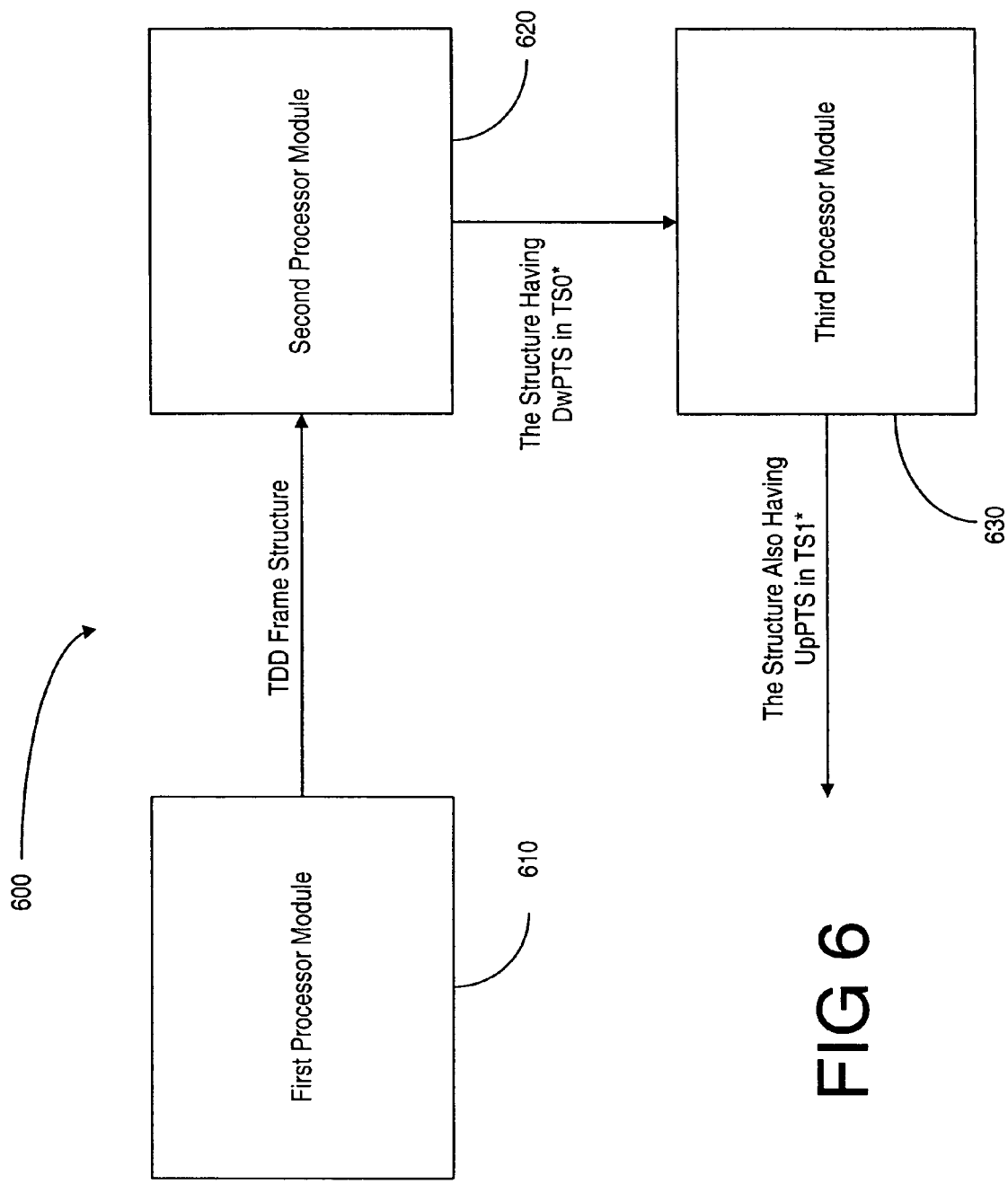
FIG. 6 is a block diagram illustrating a further embodiment of the present invention.

Referring now to the simplified block diagram of FIG. 6, an apparatus 600 is shown according to an embodiment of the present invention. The first processor module 610 creates a TDD frame structure. The second processor module 620 puts the DwPTS in the initial data timeslot TS0* (e.g. via merging or mapping). The third processor module 630 puts the UpPTS in a further data timeslot TS1*, with a guard period (GP) located between the TS0* and the TS1* (although the guard period may or may not be immediately adjacent to TS0* or TS1*). It is noted that the parts of the apparatus 600 can be located at a single location, or at different locations within a telecommunications network; for example, the second processor module may be located at a network element and/or the like, whereas the third processor module may be located at a mobile device and/or the like.

It is to be understood that the present figures, and the accompanying narrative discussions of best mode embodiments, do not purport to be completely rigorous treatments of the method, system, mobile device, network element, and software product under consideration. A person skilled in the art will understand that the steps and signals of the present application represent general cause-and-effect relationships that do not exclude intermediate interactions of various types, and will further understand that the various steps and structures described in this application can be implemented by a variety of different sequences and configurations, using various different combinations of hardware and software which need not be further detailed herein.

What is claimed is:

1. A method, for execution by a processor, comprising:
forming a time division duplex frame structure;
including a downlink pilot timeslot within an initial data timeslot of the frame structure; and,
including an uplink pilot timeslot in a further data timeslot of the frame structure,
wherein a guard period is located between the initial data timeslot and the further data timeslot; and
wherein the method further comprises allocating symbols from the initial data timeslot, or from the further data timeslot, or from both, to the guard period so as to provide a longer guard period to support deployment of a larger inter-site distance between the initial data timeslot and the further data timeslot.

2. The method of claim 1, further comprising transmitting a synchronization channel at a fixed location within the initial data timeslot.

3. The method of claim 2, wherein the synchronization channel comprises a primary synchronization channel and a secondary synchronization channel.

4. The method of claim 3, wherein both the primary synchronization channel and the secondary synchronization channel have fixed positions within the initial data timeslot.

5. The method of claim 1, further comprising transmitting a random access channel in the further data timeslot.

6. The method of claim 5, wherein the random access channel includes both a non-synchronized and a synchronized channel.

7. The method of claim 1, wherein a non-synchronized random access channel is mapped to cross the further data timeslot and the uplink pilot timeslot.

8. The method of claim 1, wherein a synchronization channel is mapped to cross the initial data timeslot and the downlink pilot timeslot.

9. A system, comprising:
a network element comprising a processor module configured to include a downlink pilot timeslot within an initial data timeslot of a frame structure; and
a mobile station configured to include an uplink pilot timeslot in a further data timeslot of the frame structure,
wherein a guard period is located between the initial data timeslot and the further data timeslot; and
wherein the network element further comprises an allocation module configured to allocate symbols from the initial data timeslot, or from the further data timeslot, or from both, to the guard period so as to provide a longer guard period to support deployment of a larger inter-site distance between the initial data timeslot and the further data timeslot.

10. An apparatus comprising:
means for forming a time division duplex frame structure;
means for including a downlink pilot timeslot within an initial data timeslot of the frame structure; and,
means for including an uplink pilot timeslot in a further data timeslot of the frame structure,
wherein a guard period is located between the initial data timeslot and the further data timeslot; and
wherein the apparatus further comprises means for allocating symbols from the initial data timeslot, or from the further data timeslot, or from both, to the guard period so as to provide a longer guard period to support deployment of a larger inter-site distance between the initial data timeslot and the further data timeslot.

11. An apparatus comprising:
a first processor module configured to form a time division duplex frame structure;
a second processor module configured to include a downlink pilot timeslot within an initial data timeslot of the frame structure; and,
a third processor module configured to include an uplink pilot timeslot in a further data timeslot of the frame structure,
wherein a guard period is located between the initial data timeslot and the further data timeslot and
wherein the apparatus further comprises an allocation module configured to allocate symbols from the initial data timeslot, or from the further data timeslot, or from both, to the guard period so as to provide a longer guard period to support deployment of a larger inter-site distance between the initial data timeslot and the further data timeslot.

12. The apparatus of claim 11, further comprising a communication module configured to transmit a synchronization channel at a fixed location within the initial data timeslot.

13. The apparatus of claim 12, wherein the synchronization channel comprises a primary synchronization channel and a secondary synchronization channel.

14. The apparatus of claim 13, wherein both the primary synchronization channel and the secondary synchronization channel have fixed positions within the initial data timeslot.

15. The apparatus of claim 11, further comprising a transmission module configured to transmit a random access channel in the further data timeslot.

16. The apparatus of claim 15, wherein the random access channel comprises both a non-synchronized and a synchronized component.

17. The apparatus of claim 11, wherein the initial data timeslot and the further data timeslot are larger than all other data timeslots within said frame structure.

18. A software product comprising a computer readable medium having executable codes embedded therein; the codes, when executed, adapted to carry out the functions of:
forming a time division duplex frame structure;
including a downlink pilot timeslot within an initial data timeslot of the frame structure; and,
including an uplink pilot timeslot in a further data timeslot of the frame structure,
wherein a guard period is located between the initial data timeslot and the further data timeslot; and
wherein the functions further comprise allocating symbols from the initial data timeslot, or from the further data timeslot, or from both, to the guard period so as to provide a longer guard period to support deployment of a larger inter-site distance between the initial data timeslot and the further data timeslot.

19. The software product of claim 18, wherein the functions further comprise transmitting a synchronization channel at a fixed location within the initial data timeslot.

20. The software product of claim 19, wherein the synchronization channel comprises a primary synchronization channel and a secondary synchronization channel.

* * * * *